(12) United States Patent
Bibaric et al.

(10) Patent No.: US 10,524,478 B2
(45) Date of Patent: Jan. 7, 2020

(54) BAKING OVEN

(71) Applicant: HAAS FOOD EQUIPMENT GMBH, Vienna (AT)

(72) Inventors: Markus Bibaric, Kierling (AT); Peter Buczolits, Stockerau (AT); Johannes Haas, Vienna (AT); Josef Haas, Leobendorf (AT); Stefan Jiraschek, Koenigsbrunn (AT); Karl Knirsch, Vienna (AT); Markus Scheller, Bruderndorf (AT); Michael Schuck, Stockerau (AT)

(73) Assignee: Haas Food Equipment GmbH, Vienna (AT)

( * ) Notice: Subject to any disclaimer, the term of this patent is extended or adjusted under 35 U.S.C. 154(b) by 551 days.

(21) Appl. No.: 15/129,133

(22) PCT Filed: Apr. 28, 2015

(86) PCT No.: PCT/EP2015/059133
§ 371 (c)(1),
(2) Date: Sep. 26, 2016

(87) PCT Pub. No.: WO2015/165868
PCT Pub. Date: Nov. 5, 2015

(65) Prior Publication Data
US 2017/0105420 A1    Apr. 20, 2017

(30) Foreign Application Priority Data
Apr. 29, 2014   (AT) .................................. A 310/2014

(51) Int. Cl.
*A21B 5/02*   (2006.01)
*A21B 5/00*   (2006.01)
(Continued)

(52) U.S. Cl.
CPC .................. *A21B 1/14* (2013.01); *A21B 1/06* (2013.01); *A21B 1/48* (2013.01); *A21B 3/04* (2013.01); *A21B 5/023* (2013.01)

(58) Field of Classification Search
CPC .. A21B 5/023; A21B 5/02; A21B 1/42; A21B 1/46; A21B 1/48
See application file for complete search history.

(56) References Cited

U.S. PATENT DOCUMENTS 2,819,691 A    1/1958   Schlicksupp
3,843,315 A *  10/1974  Sorensen ................. A21B 1/48
                                                    432/122
(Continued)

FOREIGN PATENT DOCUMENTS

CN    201011834 Y    1/2008
DE    3217502 A1    12/1982
(Continued)

*Primary Examiner* — Dana Ross
*Assistant Examiner* — Lawrence H Samuels
(74) *Attorney, Agent, or Firm* — Laurence A. Greenberg; Werner H. Stemer; Ralph E. Locher

(57) ABSTRACT

A baking oven for producing baked, preferably edible products, includes at least one upper heating apparatus configured as a radiant heating apparatus and at least one lower heating apparatus configured as a radiant heating apparatus in each of which a fuel mixture containing primary air and a fuel is burnt. The upper heating apparatus is disposed in an upper baking area and above an upper transport level and is directed onto a back surface of an upper plate configuration for heating a baking mould from above. The lower heating apparatus is disposed in a lower baking area between the upper transport level and a lower transport level and is directed onto the back surface of a lower plate configuration for heating the baking mould from above.

27 Claims, 4 Drawing Sheets

(51) Int. Cl.
*A21B 1/14* (2006.01)
*A21B 1/06* (2006.01)
*A21B 1/48* (2006.01)
*A21B 3/04* (2006.01)

(56) References Cited

U.S. PATENT DOCUMENTS

| | | | | |
|---|---|---|---|---|
| 4,366,177 A * | 12/1982 | Wells | ............... | A21B 1/48 |
| | | | | 126/21 R |
| 4,417,508 A * | 11/1983 | Haas, Sr. | ............... | A21B 5/02 |
| | | | | 432/242 |
| 4,438,685 A * | 3/1984 | Haas, Sr. | ............... | A21B 5/02 |
| | | | | 134/56 R |
| 5,787,800 A * | 8/1998 | Kloppenburg | ......... | A21B 5/023 |
| | | | | 99/475 |
| 5,906,485 A * | 5/1999 | Groff | ............... | A21B 1/48 |
| | | | | 432/121 |
| 5,955,129 A * | 9/1999 | Haas, Sr. | ............... | A21B 5/026 |
| | | | | 426/231 |
| 6,575,083 B2 * | 6/2003 | Haas | ............... | A21B 5/03 |
| | | | | 99/353 |
| 7,490,543 B2 * | 2/2009 | Bott | ............... | A21B 1/46 |
| | | | | 99/386 |
| 2003/0037683 A1 * | 2/2003 | Haas | ............... | A21B 5/03 |
| | | | | 99/426 |
| 2005/0279342 A1 * | 12/2005 | Bott | ............... | A21B 1/46 |
| | | | | 126/21 A |
| 2008/0264406 A1 | 10/2008 | Burtea et al. | | |
| 2012/0121771 A1 * | 5/2012 | Jones | ............... | F23D 14/14 |
| | | | | 426/243 |
| 2014/0069283 A1 * | 3/2014 | Haas | ............... | A21B 3/07 |
| | | | | 99/427 |
| 2014/0076176 A1 * | 3/2014 | Haas | ............... | A21B 5/023 |
| | | | | 99/427 |
| 2015/0373997 A1 * | 12/2015 | Reinhart | ............... | A21B 1/46 |
| | | | | 99/352 |

FOREIGN PATENT DOCUMENTS

| | | |
|---|---|---|
| DE | 3319886 A1 | 12/1984 |
| DE | 102011054018 A1 | 3/2013 |
| WO | 9614750 A1 | 5/1996 |
| WO | 2008003869 A1 | 1/2008 |

* cited by examiner

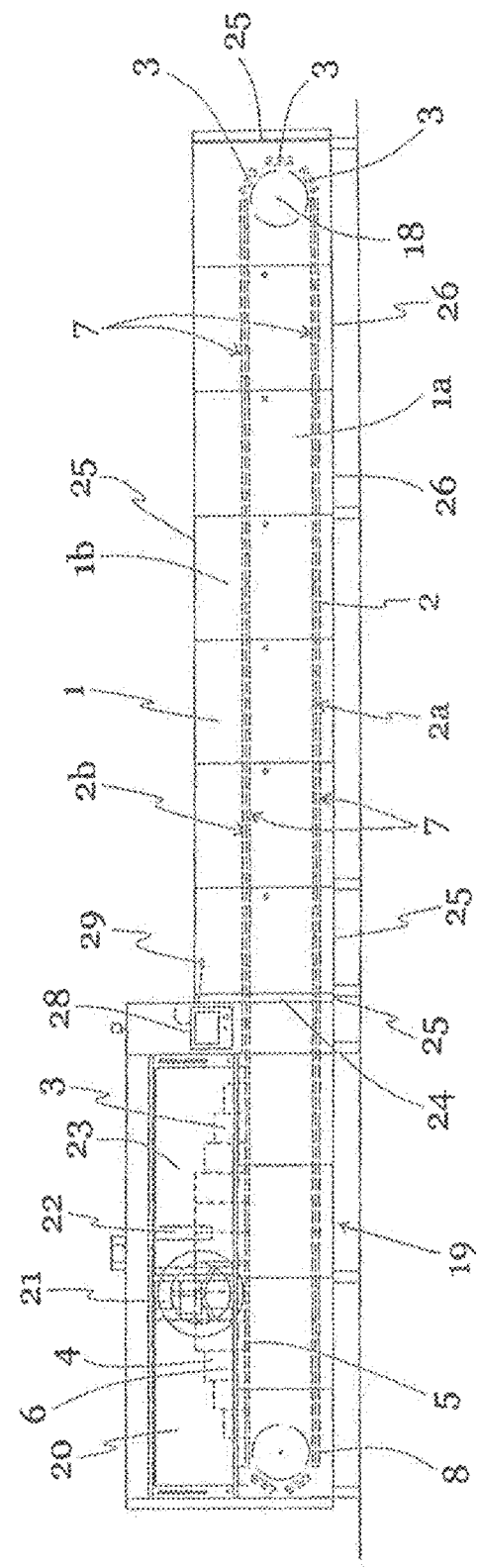

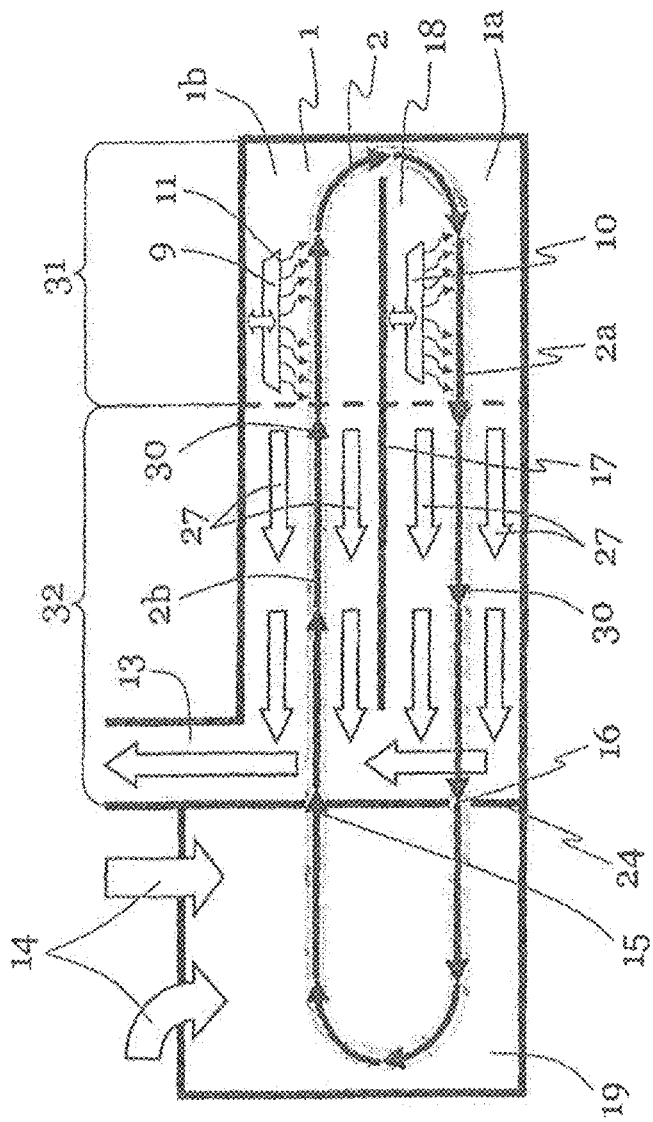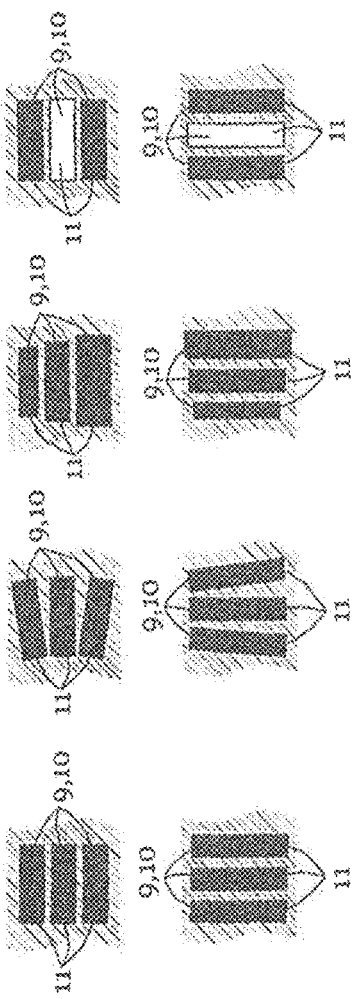

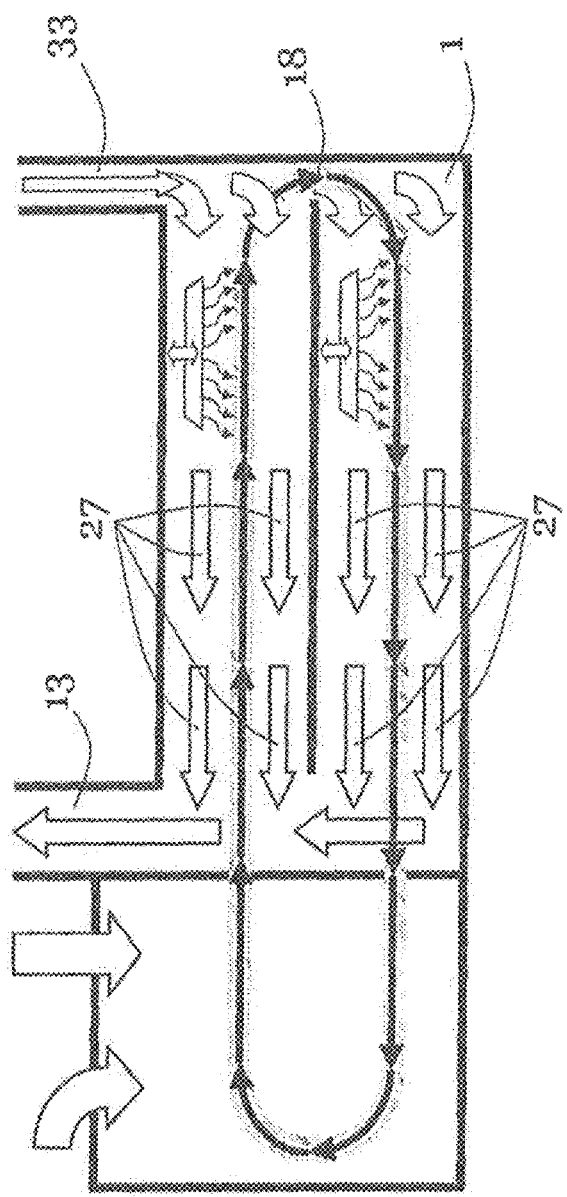
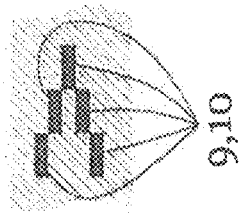
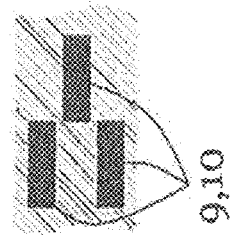
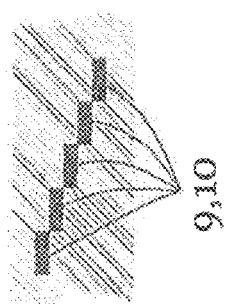
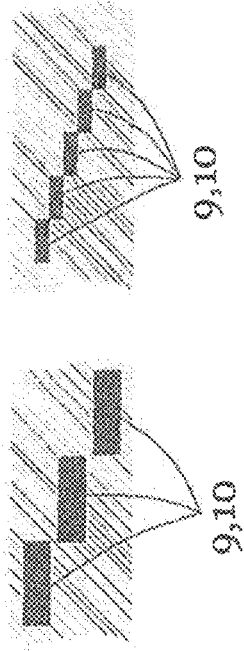

BAKING OVEN

BACKGROUND OF THE INVENTION

Field of the Invention

The invention relates to a baking oven for producing baked, preferably edible products, comprising: a baking chamber, having a lower baking area and an upper baking area disposed above the lower baking area, a baking tong chain which is moved continuously in a circulating manner along an upper transport level through the upper baking area and along a lower transport level through the lower baking area and which contains openable and closable baking tongs, wherein the baking tongs each comprise an upper plate arrangement and a lower plate arrangement between which a baking mould for the baked products is formed in the closed position, wherein the upper plate arrangement and the lower plate arrangement each have on their side facing away from the baking mould, a back surface which are each connected via a heat-conducting and storing base body to the baking mould and wherein the baking tongs are turned over on transition from the upper transport level to the lower transport level so that the upper plate arrangement disposed in the upper transport level above the lower plate arrangement is disposed in the lower transport level underneath the lower plate arrangement.

Baking ovens for producing baked products, in particular baking ovens for producing wafers are known in various embodiments. For example, baking ovens for producing crispy brittle flat or hollow wafers are known in which a wafer dough is baked in openable and closable and lockable baking tongs under high pressure. These wafers have a crispy and/or brittle consistency and are known for example as cream-filled wafer slices having multiple layers of cream and wafer layers located one above the other.

Furthermore, baking ovens are known for the production of soft waffles in which a waffle dough is baked in a substantially pressureless manner in an openable and closable waffle tong.

For the industrial production of wafers, in particular for the in-line production of such baked products, baking ovens are known in which the baking tongs are guided through a plurality of oven parts along the course of a baking tong chain for baking the products. The baking tong chain corresponds to an endless conveyor on which a plurality of baking tongs are attached. In this case, the baking tong chain with the baking tongs is moved through the front oven part in which the baking tongs are opened, the usually liquid dough or the baking mass is applied to the baking tong and then the baking tong is closed again. When the baking tong is closed, a baking mould is formed between the two baking plates. The dough or the baking mass is located in this baking mould. The baking tong is then conveyed along the baking tong chain though the heated baking chamber. Then, preferably in the front oven part, the baking tong is opened again and the finished baked product is removed. The designation baking tong chain is a usual term for the person skilled in the art.

According to the prior art, the heating of the baking chamber is accomplished by means of gas burners. In these burners a mixture of air and a fuel, preferably a gaseous fuel such as natural gas etc. is burnt. The combustion takes place in a flame emerging from the burner. Furthermore, in addition to primary air, which is used for direct combustion of the fuel mixture, secondary air is also conveyed through the baking chamber. This secondary air is in particular extracted from the surroundings by convection. In particular, conventional baking ovens are open on their underside in order to conduct secondary air therethrough in the best possible manner. An extractor for extracting the combustion gases is provided in the upper area of the baking chamber.

A disadvantage with known ovens is that the efficiency, in particular the efficient utilization of the fuel is not achieved.

BRIEF SUMMARY OF THE INVENTION

It is now the object of the invention to provide a baking oven which has an improved efficiency compared with conventional baking ovens. The improvement in the efficiency preferably comprises several measures. These measures together have a synergistic effect by means of which the efficiency is particularly improved. However, an improvement in the efficiency is also brought about by each individual measure. The subtasks of the object according to the invention are:

that a complete, clean and in particular pollutant-free combustion of the fuel takes place, that the energy produced during the combustion, in particular the dissipated heat, is utilized in the best possible manner, that no baking waste is burnt during combustion since as a result, for example, during the combustion of fats or oils, further pollutants are produced, that the combustion chamber is cooled as little as possible by incoming media, that the pouring area in which the dough is introduced into the baking tongs can be kept cool relative to the baking chamber, and that the baking chamber is kept compact and insulated in the best possible manner so that the heat loss is reduced, improved regulatability and controllability of the heating improved temperature distribution of the baking plates.

The object according to the invention is in particular solved by the features of the independent patent claims.

With the increase in efficiency, particular care is taken to ensure that the heating apparatus operates substantially free from pollutants and that the dissipated heat is utilized in the best possible way.

By providing a radiant heating apparatus in which a premixed fuel mixture is burnt, it is prevented that NOx, in particular thermal NOx or unburnt hydrocarbons are released as waste gas due to fluctuations in the fractions of the fuel mixture. Furthermore, the carbon monoxide emission is reduced by the more efficient combustion process.

The above arrangement of the heating apparatus prevents combustion chamber waste such as in particular dough residues, fats, oils reaching the heating apparatus and being burnt there. Those waste gases formed by combustion of the baking chamber waste are thereby avoided.

The provision of radiant heating apparatuses further prevents that fuel, in particular hydrocarbons, is released unburnt to the surroundings.

By using radiant heating apparatuses in which a premixed fuel mixture of primary air and fuel is burnt, the baking chamber can be configured to be substantially closed. As a result, the thermal insulation of the baking chamber can be substantially closed. This further has the effect that the heat produced during the combustion can be held longer in the baking oven, thus improving the efficiency. Furthermore, in a substantially closed baking chamber, no ambient air, in particular no secondary air from the surroundings can enter into the baking chamber which would further cool the baking chamber. Secondary-air-free operation is not possible with conventional burners.

As a result of the substantially closed design of the baking chamber, the convection energy of the ascending hot combustion chamber gas can also be better utilized since a substantially closed convention channel system is formed. As a result of the arrangement of further convection elements, in particular between the upper baking area and the lower baking area, the ascending hot combustion chamber gas can optionally be conveyed in the horizontal direction through the baking chamber with the result that the heat of this gas can be delivered better to the baking tongs and/or to the baking chamber. These convention conducting elements can for example be arranged in the form of inclined lamellae. It is thereby possible that baking chamber waste can fall from the upper baking area through the convection conducting elements. The entire baking chamber waste collects in the lower area of the baking oven and can subsequently be easily removed. This prevents this baking chamber waste from being burnt in the hot baking chamber—with the result that the efficiency is further improved.

A further advantage of the arrangement of the radiant heating apparatuses according to the invention is that these can be controlled and/or regulated separately from one another. The fuel mixture is guided via a conveyor apparatus, in particular a blower, to the radiant heating apparatuses. By regulating or controlling the mass flow of the fuel mixture, each radiant heating apparatus can be controlled or regulated individually, in particular independently of the other radiant heating apparatus. As a result the efficiency is further improved.

The baking oven according to the invention comprises a baking tong chain. The term "baking tong chain" is a usual term for the person skilled in the art for an endless conveyor on which baking tongs are fixed or installed. The baking tongs are arranged one after the other in the transport direction, thus forming a chain-shaped structure. Optionally the endless conveyor is also composed of chain links. However the designation "baking tong chain" is in no way restricted to a chain in the conventional sense nor must the baking tong chain comprise a conventional chain.

The baking oven according to the invention comprises a baking oven for the industrial production of baked products such as in particular wafers. Such ovens have an elongated machine frame which has dimensions of 10 metres, 20 metres or more in the conveying direction of the baking tongs.

The invention relates in particular to a baking oven for producing baked, preferably edible products, comprising: a baking chamber, having a lower baking area and an upper baking area disposed above the lower baking area, a baking tong chain which is moved continuously in a circulating manner along an upper transport level through the upper baking area and along a lower transport level through the lower baking area and which contains openable and closable baking tongs, wherein the baking tongs each comprise an upper plate arrangement and a lower plate arrangement between which a baking mould for the baked products is formed in the closed position, wherein the upper plate arrangement and the lower plate arrangement each have on their side facing away from the baking mould, a back surface which are each connected via a heat-conducting and storing base body to the baking mould and wherein the baking tongs are turned over on transition from the upper transport level to the lower transport level so that the upper plate arrangement disposed in the upper transport level above the lower plate arrangement is disposed in the lower transport level underneath the lower plate arrangement wherein it is optionally provided that at least one upper heating apparatus configured as a radiant heating apparatus and at least one lower heating apparatus configured as a radiant heating apparatus are provided in which respectively one fuel mixture containing primary air and a fuel is burnt, that the upper heating apparatus is disposed in the upper baking area and above the upper transport level and is directed onto the back surface of the upper plate arrangement for heating the baking mould from above, and that the lower heating apparatus is disposed in the lower baking area between the upper transport level and the lower transport level and is directed onto the back surface of the lower plate arrangement for heating the baking mould from above.

Optionally it is provided that the heating apparatuses each have on their underside a porous body for the preferably flame-free combustion of the fuel mixture therein and/or on the surface thereof.

Optionally it is provided that the porous body is or contains a metal fabric, a wire fabric or a metal mesh.

Optionally it is provided that a conveying apparatus such as in particular a blower for supplying the fuel mixture to the heating apparatus is provided, and that the heating power of the heating apparatus can be varied by means of a control and/or regulation of the conveying apparatus, and/or that the upper heating apparatus is connected to an upper conveying apparatus and the lower heating apparatus is connected to a lower conveying apparatus, so that the heating powers of the upper heating apparatus and the lower heating apparatus can be varied separately from one another, in particular can be controlled separately or can be regulated separately.

Optionally it is provided that the baking chamber is configured to be substantially closed except for the following openings: a vent for discharging the combustion gases from the baking chamber, one or more supply openings for the fuel mixture, in particular for the primary air and the fuel, an inlet opening for the baking tong chain and an outlet opening for the baking tong chain, optionally an inlet opening for improving the convection flow by supplying air or recirculated combustion chamber gas into the baking chamber so that ambient air, in particular secondary air does not enter or only a small amount enters into the baking chamber.

Optionally it is provided that a convection conducting element is provided between the lower baking area and the upper baking area for deflecting hot, ascending baking chamber gas of the lower baking area in the horizontal direction and guiding the same in places through the baking chamber.

Optionally it is provided that the convection conducting element is configured as an arrangement of a plurality of inclined lamellae, the lamellae whereof extend between the lower baking area and the upper baking area transversely to the running direction of the baking tong chain through the baking chamber or that the convention conducting element is configured as a horizontally running plate body which extends through the baking chamber between the lower baking area and the upper baking area, wherein the plate body optionally has openings.

Optionally it is provided that a plurality of upper heating apparatuses and/or a plurality of lower heating apparatuses are provided, and/or that the heating powers of the upper heating apparatuses and the lower heating apparatuses can be varied separately from one another, in particular can be controlled separately or can be regulated separately, or that the heating powers of two upper heating apparatus, or that the heating powers of two lower heating apparatuses can be varied separately from one another, in particular can be controlled separately or can be regulated separately.

Optionally it is provided that the vent is disposed along the convection flow direction of the baking chamber gas remote from the heating apparatuses so that the hot ascending baking chamber gas is guided in the horizontal direction through the baking chamber before it exits through the vent.

Optionally it is provided that an upper heating apparatus and a lower heating apparatus are provided in the area of the rear deflection point of the baking tong chain and/or directly before and after the rear deflection point of the baking tong chain and that the vent is disposed along the convection flow direction of the baking chamber gas remote from the heating apparatuses, preferably in the vicinity of the partition wall.

Optionally it is provided that a front oven part is provided in which the baking tongs are guided and deflected from the lower transport level into the upper transport level, that in the front oven part, in particular along the upper transport level, a device for opening the baking tongs, a dispensing station, a loading station and a device for closing the baking tongs are disposed consecutively in the running direction of the baking tongs and that the front oven part is separated from the baking chamber by a partition wall, wherein an inlet opening for the baking tong chain and an outlet opening for the baking tong chain are provided in the partition wall.

Optionally it is provided that the walls of the baking chamber are completely or partially provided with a thermal insulation.

Optionally it is provided that the baking chamber is closed on its underside and is provided with a thermal insulation on its underside and that the baking chamber optionally has an opening on the underside, wherein this opening preferably occupies less than ten percent of the area of the closed underside of the baking chamber.

Optionally it is provided that the baking chamber comprises a heating zone in which at least one heating apparatus is provided for heating the baking tongs by direct action of thermal radiation of the heating apparatus.

Optionally it is provided that the baking chamber comprises a radiant-heating-free zone in which no direct heating of the baking tongs by the radiation of the heating apparatus is provided, for heating of the baking tongs by the action of the convection heat of the hot combustion chamber gas moving in the convention flow direction along the upper transport level and/or along the lower transport level.

Optionally it is provided that the vent is provided in a radiant-heat-free zone of the baking chamber.

Optionally it is provided that a sensor is provided for regulating the heating apparatus, in particular for regulating the heating power of the heating apparatus, which is preferably configured as a contact-free temperature sensor.

Optionally it is provided that an inlet opening is provided for supplying air or recirculated combustion chamber gas into the baking chamber which in particular is provided in the baking chamber along the convection flow direction of the baking chamber gas remote from the vent and optionally in the area of the rear deflection point of the baking oven so that in order to improve the convection flow, air or recirculated combustion chamber gas is introduced into the baking chamber in a controlled manner, where the air is preferably preheated in order to prevent any cooling of the baking chamber and wherein the area of the inlet opening preferably occupies less than ten percent of the area delimiting the baking chamber.

Optionally it is provided that in all the exemplary embodiments an opening is provided in the combustion chamber to assist the convection, wherein ambient air or recirculated combustion chamber gas is introduced into the combustion chamber through this opening.

Optionally no convection element is provided. In this case the hot combustion chamber gas is preferably deflected by the upper combustion chamber boundary itself in the horizontal direction. In particular, the hot combustion chamber gas is prevented by the arrangement of the heating apparatuses, the vent and optionally by a further opening for improving the convection from leaving the baking chamber via the shortest path via the vent. By diverting the convection flow direction, the hot combustion chamber gas is held longer in the combustion chamber, with the result that the heat transfer and the heat dissipation of this gas to the baking tongs is improved and more efficient utilization of the heating energy is achieved.

Optionally in all embodiments heating apparatuses configured only as radiant heating apparatuses are provided in which the combustion preferably takes place substantially flame-free.

BRIEF DESCRIPTION OF THE SEVERAL VIEWS OF THE DRAWING

The invention is described further subsequently with reference to figures.

FIG. 1 shows a schematic side view of a baking oven according to the invention.

FIG. 2 shows a schematic view of one embodiment of the baking oven according to the invention.

FIG. 3 shows a schematic view of the gas guidance in the design of the oven according to FIG. 2.

FIGS. 4*a*, 4*b*, 4*c* and 4*d* show schematically in a plan view from above various possible arrangements for the upper and lower heating apparatuses and therefore various possibilities for influencing the heat transfer.

FIG. 7 shows another schematic view of an embodiment of the baking oven according to the invention.

FIGS. 8*a*, 8*b*, 8*c* and 8*d* show schematically different arrangements of the elements of the upper or lower heating apparatuses along the baking chamber in a view from above.

DESCRIPTION OF THE INVENTION

Figure 5:
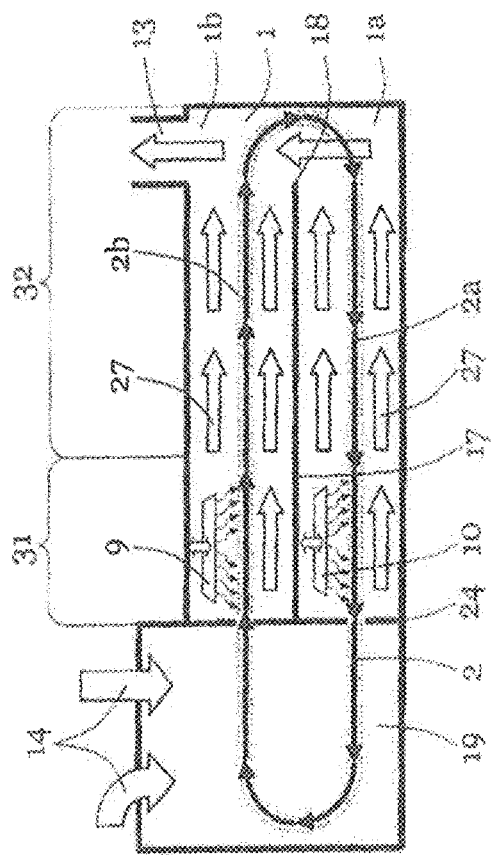
FIG. 5 shows a schematic view of another embodiment of a baking oven according to the invention.

FIG. 1 shows a baking oven according to the invention with a baking chamber 1, a lower baking area 1*a* and an upper baking area 1*b*. The baking tong chain 2 extends along a lower transport level 2*a* and along an upper transport level 2*b* through the baking chamber 1. The baking tong chain is a design of an endless conveyor. On this a plurality of baking tongs 3 are disposed consecutively in the transport direction similar to a chain. Preferably one baking tong 3 after the other is arranged along the entire course of the baking tong chain.

The baking tong chain with its baking tongs 3 extends through the baking chamber 1 and through the front oven part 19. Located in this front oven part 19 is a device 20 for opening the baking tongs 3, a dispensing station 21 for removing the baked bodies, a loading station 22 for applying the dough or the dough mass as well as a device 23 for closing the baking tongs 3. According to a preferred embodiment, the front oven part is substantially separated from the baking chamber 1 by a partition wall 24.

The baking tongs 3 comprise an upper plate arrangement 4 and a lower plate arrangement 5. The upper plate arrangement 4 is connected to the lower plate arrangement 5 in such a manner that the baking tongs can be opened. In the closed state a baking mould 6 in which the dough or the baking mass can be baked is formed between the two plate arrangements 4 and 5.

Over a large part of the transport of the baking tongs 3 along the baking tong chain 2, the baking tongs 3 are closed. The baking tongs 3 each have a back surface 7 on their outer surfaces, in particular on the upper or the lower external surface. The external back surfaces 7 are connected to the internal surfaces, in particular to the baking mould 6. The connection is made via a base body 8 which is adapted to conduct heat and to store heat. The base body 8 can, for example, be configured as a baking plate made of metal, in particular made of steel. This base body configured as a baking plate has a relief-type structure on its one side which forms at least a half of the baking mould. On the other side, in particular on the back surface 7, the baking plate can be flat or ribbed.

Optionally, the base body or bodies 8 is or are configured as multipart. For example, a frame structure can be provided in which a baking plate is held. In principle, the base body 8 which can be one-part or multipart, has properties which enable storage and conduction of heat from the back surface 7 to the baking mould 6.

The baking tong chain 2 is deflected at a rear deflection point 18. This deflection point is, for example, designed as a deflection roller. In this areas the baking tongs are conveyed from the upper transport level 2b into the lower transport level 2a. During this deflection, according to a preferred embodiment, the baking tongs are entrained and therefore co-rotated with the endless conveyor. The upper plate arrangement 4 lying at the top in the upper baking area 1b is thus located in the lower baking area 1a on the underside of the baking tong.

In the front oven part 19 a further deflection point is provided at which the baking tongs are conveyed from the lower baking area 1a or from the lower transport level 2a back into the upper transport level 2b or into the upper baking area 1b. During this deflection the baking tong is also rotated.

The apparatus according to the invention further comprises a control unit 28. This control unit 28 is suitable and adapted to control various parameters of the baking oven. In particular, this relates to the drive of the baking tong chain 2, the drive of other components such as, for example, the loading station 22, the dispensing station 21, optionally the device for closing the baking tongs 23, optionally the device for opening the baking tongs 20 and/or the control of the heating of the baking chamber 1. Preferably at least one sensor 29 is provided. This sensor can, for example, be a temperature sensor, a moisture sensor and/or a motion sensor. A temperature sensor can be used for regulating the heating power.

According to a preferred embodiment of the invention, the underside 26 of the baking chamber is substantially closed. Preferably the entire baking chamber 1 is provided with a thermal insulation 25 so that the heat losses are reduced.

For reasons of clarity, the arrangement of the heating apparatuses and the convection element is not shown in FIG. 1.

FIG. 2 shows a first possible configuration of a baking oven according to the invention in a schematic side view or in a schematic sectional view. The baking oven comprises a baking chamber 1 with a lower baking area 1a, an upper baking area 1b, a schematically depicted baking tong chain 2, which is moved through the baking chamber along a lower transport level 2a and along an upper transport level 2b. In this case, the baking tong chain 2 is substantially configured as a circulating endless conveyor. Baking tongs 3 are disposed on this circulating endless conveyor which for reasons of clarity are not shown in FIG. 2. The baking tong chain 2 also runs through the front oven part 19 in which the non-depicted components dispensing station 21, loading station 22 as well as devices for opening and for closing the baking tongs 20, 23 are provided. The front oven part 19 is preferably substantially separated from the baking chamber 1 by a partition wall 24. The baking chamber 1 is substantially closed. In particular, it is substantially closed on its underside 26.

Substantially closed furthermore means that relatively small openings can be provided. These openings are caused, for example, by production technology tolerances since a hermetic sealing of the baking chamber of such a large installation would only be possible at very great expense. Furthermore, the baking chamber 1 comprises a vent 13 for removing the combustion gases. Furthermore, the baking chamber and in particular the partition wall 24 comprises an inlet opening 15 for entry of the baking tong chain. Furthermore, the baking chamber 1 and in particular the partition wall 24 comprises an outlet opening 16 for exit of the baking tong chain and the baking tongs.

An upper heating apparatus 9 and a lower heating apparatus 10 are provided in the baking chamber 1. The upper heating apparatus 9 is directed from above onto the baking tongs of the baking tong chain 2. The upper heating apparatus 9 is located in the upper baking area 1b and above the upper transport level 2b. The lower heating apparatus 10 is located in the lower baking area 1a. Furthermore, the lower heating apparatus 10 is located above the lower transport level 2a. Preferably the lower heating apparatus 10 is located between the upper transport level 2b and the lower transport level 2a. The lower heating apparatus 10 is directed substantially downwards so that the heating apparatus preferably configured as a radiant heater is directed onto the upwardly pointing back surfaces 7 of the baking tongs 3. The upper heating apparatus 9 is also directed from above onto the baking tongs 3 so that the radiation acts on the upper lying back surface 7 of the baking tong 3.

Since the baking tongs 3 are preferably turned through 180° at the rear deflection point 18, a back surface 7 of the baking tong 3 is irradiated by the upper heating apparatus 9 and the other opposite back surface 7 of the baking tong is irradiated by the lower heating apparatus 10.

Preferably the upper heating apparatus 9 can be controlled or regulated independently of the lower heating apparatus 10. In particular the heating power is controlled or regulated so that the amounts of heat received by the baking tongs can be varied and adapted.

The depicted design of the heating apparatuses 9, 10 is a schematic view. In this case, one or more upper heating apparatuses 9 and/or one or more lower heating apparatuses 10 can be provided. These individual heating apparatuses 9, 10 can optionally be controlled or regulated separately from one another. The control of the radiation intensity and the dissipated quantity of heat can be accomplished, for example, by controlling the throughput of a blower or a conveying apparatus, whereby the amount of fuel introduced is varied. Furthermore, the amount of heat dissipated to the baking tongs 3 can also be varied by further possibilities for regulation or possibilities for control, as will be explained further in the description of FIGS. 4a to 4d.

Preferably at least one convection element 17 is provided in the baking chamber 1. This convection element 17 is disposed between the lower transport level 2a and the upper transport level 2b. The lower baking area 1b is separated from the upper baking area 1b by the convection element 17. Preferably the convection element 17 forms the boundary between lower baking area 1a and upper baking area 1b. The convection element 17 can, for example, be configured as a continuous plate-shaped body which extends between the two baking areas 1a and 1b. The convection element 17 preferably extends parallel to the lower transport level 2a and/or to the upper transport level 2b. Preferably it is attached laterally, optionally on both sides of the machine frame and extends transversely to the transport direction 30 of the baking tongs from an inner side to the opposite inner side of the baking chamber 1.

Optionally the convection element 17 is not configured to be continuous but has openings. For example, the convection element 17 has a lamella-shaped structure. With such a convection element, a plurality of inclined lamella-shaped or plate-shaped individual convection elements are disposed between the lower baking area 1a and the upper baking area 1b, a distance being provided between them. Such a lamella-shaped configuration has the advantage that baking chamber waste can fall through the convection element 17. Optionally the convection element can be omitted completely.

Hot combustion chamber gas is deflected in the horizontal direction by the convection element 17. In particular, the hot combustion chamber gas of the lower baking area 1a is prevented from leaving the baking chamber 1 by the shortest path via the vent 13. As a result of the diversion of the convection flow direction 27 the hot combustion chamber gas is held for longer in the baking chamber 1 with the result that the heat transfer and heat dissipation of this gas to the baking tongs 3 is improved and more efficient utilization of the heating energy is achieved.

Furthermore a supply opening for fresh air is provided. This is indicated schematically in the present diagram. In particular, a plurality of openings can also be provided: one opening for the combustion air, in particular for the primary air and one for the fuel, in particular for gaseous fuel such as natural gas. Preferably an opening 14 for supplying fresh air is also provided. This is used, for example, for cooling the front oven part 19 of the baking machine and/or for producing a slight excess pressure in the front oven part 19 so that the hot gas does not flow from the baking chamber 1 into the front oven part 19. A supply opening for the fuel mixture can also be provided in the area of the baking chamber 1 and in particular in the area of the rear deflection point 18.

Furthermore, in all embodiments an inlet opening can also be provided at the rear deflection for supplying air, which is possibly preheated. This is used on the one hand to avoid the formation of condensate during the heating phase and on the other hand to promote convection in the direction of the vent 13.

The primary air is supplied, for example, by extracting ambient air from the production hall. Optionally a fresh air supply from outside the production hall is also provided. The fuel can, for example, be guided via a gas line into the baking oven according to the invention. Optionally a mixing device is provided for mixing the primary air with the fuel. This mixer can also lie outside the baking over or inside the baking oven. Preferably the mixer is controlled by a control unit so that the composition of the fuel mixture can be varied. For example, the composition is regulated so that the oxygen content in the waste gas can be measured by means of a lambda probe. Subsequently an optimal combustion of the fuel can be achieved by regulating the air-fuel ratio. Optionally the primary air and/or the fuel is preheated before the combustion. This preheating is accomplished, for example, passing the fuel mixture or its components through the baking chamber 1 and/or through the front oven part 19. According to a preferred embodiment the fuel mixture and in particular the primary air is guided through the front oven part 19. There the primary air is heated in order to achieve more efficient combustion. Furthermore, the front oven part 19 is cooled optionally by supplying cool air. The baking chamber 1 is however substantially separated from the front oven part 19 by a partition wall 24. This configuration of the supply and mixing of the fuel mixture and in particular the primary air and the fuel can be accomplished in all embodiments in the same or similar manner to that in FIG. 2.

The heating apparatuses 9, 10 of all the embodiments are preferably designed as radiant heating apparatuses as already described further above. Such radiant heating apparatuses can be designed for example as porous burners, metal fabric burners or similar burners. In this case, a premixed fuel mixture containing a fuel and primary air is guided into the heating apparatus and there is burnt internally or on the surface of a porous body. The porous body is preferably designed as a metal fabric. This metal fabric comprises a porous structure of metal fibres which has a relatively large surface area. The fuel mixture is burnt on the surface and/or in the intermediate space of these metal fibres. The heat is released for the most part here as radiant heat. In the arrangement according to the invention, the radiation is directed substantially downwards onto the back surfaces 7 of the baking tongs 3. However, heat is introduced into the baking chamber 1 via convection by the mass flow of the introduced fuel mixture. In particular, combustion gases are guided through the porous body into the baking chamber 1. As described further above, this hot combustion gas is guided through the baking chamber in order to be able to dissipate the heat optimally to the baking tongs 3.

The radiant heating apparatuses of all the embodiments preferably comprise a mixing chamber in which the fuel mixture is introduced. This mixing chamber substantially corresponds to a cavity. This mixing chamber can, for example, be configured to be box-shaped and have a rectangular opening. In principle however, any form of an opening can be provided. The opening is preferably, as described above, covered or closed with a porous body. On the opposite side of the porous body the mixing chamber has an opening for supplying the fuel mixture. If the fuel mixture is now introduced into the mixing chamber, the fuel mixture is distributed there and guided uniformly into the porous body. After ignition of the radiant heating apparatus, combustion of the fuel mixture takes place in the intermediate spaces or on the surface of the porous body. This porous body is thereby strongly heated and dissipates heat in the form of thermal radiation.

In the embodiment of FIG. 2, the heating apparatuses 9, 10 are preferably disposed in the area of or directly before and after the rear deflection point 18. The baking tongs 3 are therefore only heated in a partial region of their path through the baking oven by the heating apparatuses. In order to nevertheless achieve a uniform baking of the baked products to be formed, the baking tongs have a base body 8. This base body 8 can be one-part or multipart. It has a heat storage capacity so that the heat introduced by the heating apparatuses 9, 10 can be dissipated for a longer time to the baking mould 6. In this case, heat is also guided from the back surface 7 into the baking mould 6.

FIG. 3 shows a schematic view of the convection flow directions 27 or the guidance of the convection flow of the hot combustion chamber gas. In particular in the lower baking area 1a, the convection flow direction is guided in the horizontal direction so that the hot baking chamber gas is in contact with the baking tongs for longer.

FIG. 4 show in a plan view from above in principle two different possibilities for the arrangement of the heating apparatuses 9, 10. The heating apparatuses preferably comprise an elongated, rectangular radiant body configured as a porous body 11. The heating apparatuses 9, 10 can either be arranged transversely to the transport direction 30 as shown in FIG. 4 at the bottom or longitudinally to the transport direction 30 of the baking tongs as shown in FIG. 4 at the top.

As shown in FIG. 4b, the position of the heating apparatuses can be varied to influence the heat transfer. Thus, the angle between the heating apparatuses and the transport direction 30 can be varied or can be configured to be variable.

Furthermore, as shown in FIG. 4c, the distance between the heating apparatus 9, 10 and the baking tongs 3 can be varied.

It is shown schematically in FIG. 4d that individual heating apparatuses can be switched off or regulated separately from one another in order to influence the transferred amount of heat.

FIG. 5 shows another embodiment of a baking oven according to the invention. The individual components of this embodiment substantially correspond to the components of the baking oven from FIG. 2. A baking tong chain 2 extends in a circulating manner along a lower transport level 2a and an upper transport level 2b through the baking chamber 1 and in particular through the lower baking area 1a and the upper baking area 1b. In addition, the baking tong chain 2 or its baking tongs 3 are guided through the front oven part 19. Furthermore the baking oven comprises an upper heating apparatus 9 and a lower heating apparatus 10. These heating apparatuses 9, 10 are preferably configured as radiant heating apparatuses and act from above onto the respective baking tongs 3 disposed in the area of the heating apparatuses 9, 10. The front oven part 19 is separated by a partition wall 24 from the baking chamber 1. Only openings for the entry 15 and exit 16 of the baking tong chain 2 are provided. According to this embodiment, the heating apparatuses 9, 10 are provided directly before or directly after the partition wall 24. Furthermore the baking chamber 1 comprises a vent 13. This vent 13 is disposed along the convection flow direction 27 remote from the heating apparatuses 9, 10. In particular, the vent has a distance in the transport direction 30 of the baking tongs 3. This distance brings about the horizontal deflection of the hot combustion chamber gases through most of the oven.

A convection element 17 is provided between the upper baking area 1b and the lower baking area 1a. As in the preceding embodiments, the convection element 17 can be formed by a continuous wall, or have a plate-shaped or lamella-shaped structure. Furthermore, as in the preceding embodiment the baking chamber 1 is configured to be substantially closed and in particular closed on its underside 29. The convection flow direction 27 is deflected in the horizontal direction by the convection element 17 so that the hot combustion chamber gas is guided in the horizontal or at least partially horizontal direction along the transport surfaces through the baking chamber.

Figure 6:
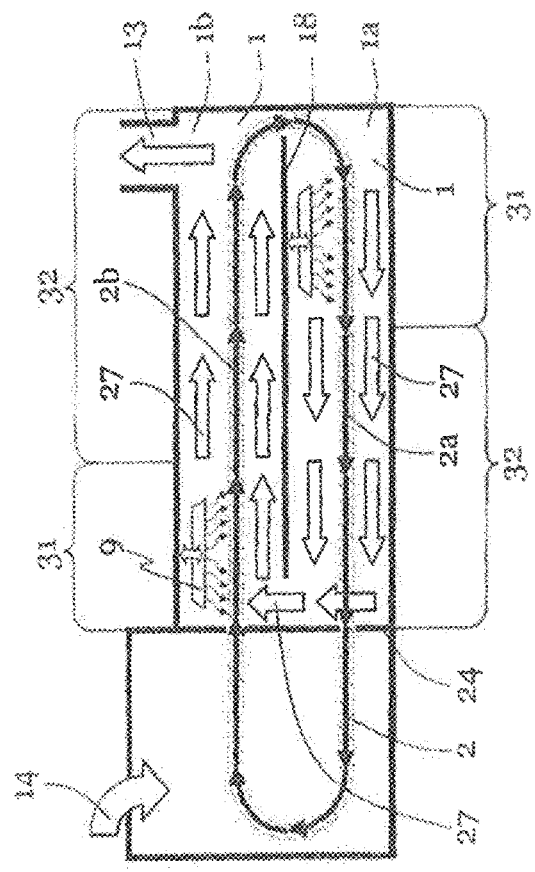
FIG. 6 shows another schematic view of an embodiment of the baking oven according to the invention.

FIG. 6 shows another possible configuration of the baking oven according to the invention in which again a baking tong chain extends along a lower transport level 2a and an upper transport level 2b through a lower baking area 1a and an upper baking area 1b of the baking chamber 1. The individual components of this embodiment substantially correspond to the components of the baking oven from FIG. 2. A lower heating apparatus 10 is provided in the baking chamber. In particular, the lower heating apparatus 10 is provided in the lower baking area 1a. The upper heating apparatus 9 is provided in the upper baking area 1b. Furthermore, as in the preceding embodiments, the baking chamber 1 is opened by a vent 13. The upper heating apparatus 9 is located at a distance from the vent 13 so that hot combustion chamber gas of the upper heating apparatus 9 deflected in the horizontal direction is transported through the baking chamber 1 in order to be conveyed by natural or artificial convection along the convection flow direction 27 and further through the vent 13 from the baking chamber 1. To this end, in this embodiment the upper heating apparatus 9 is provided in the transport direction of the baking tongs in the region of or directly after the partition wall 24.

The vent 13 is located at a distance from the partition wall 24. In particular, the vent 13 is located in the region of the rear deflection point 18.

In this embodiment, the lower heating apparatus 10 is located along the convection flow direction 27 or along the transport levels 2a, 2b at a distance from the upper heating apparatus 9. According to the preceding description, a convection element 17 is provided between the lower baking area 1a and the upper baking area 1b. This is configured in such a manner that the convection flow direction 27 in the lower baking area 1a is deflected in the horizontal direction along the transport level. In particular in this configuration the lower heating apparatus 10 is provided at a distance from the partition wall 24. Particularly preferably the lower heating apparatus 10 is located in the region of the rear deflection point 18 or directly after this. In this configuration, when viewed in a longitudinal section of the apparatus, hot combustion chamber gas is conveyed in an S shape through the baking chamber. For this purpose the convection element 17 has a distance from the partition wall 24. An opening is thereby formed through which the combustion chamber gas of the lower baking area 1a can flow into the upper baking area 1b.

According to another embodiment not shown, the baking chamber configuration of FIG. 6 is substantially mirrored so that the vent 13 is provided in the area of the partition wall 24. In this embodiment, the upper heating apparatus 9 is located at a distance from the vent 13, in particular directly before or in the area of the rear deflection point 18. The lower heating apparatus 10 is located at a distance from, in particular at a distance laterally along the transport level, from the upper heating apparatus 9. Again a convection element 17 is provided between the lower baking area and the upper baking area. This convection element 17 is located at a distance from the rear deflection point 18 so that an opening is formed in the area of the rear deflection point 18 through which hot combustion chamber gas can flow from the lower baking area 1a into the upper baking area 1b. Optionally the convection element 17 is guided as far as the partition wall 24. As in all the other embodiments, the convection element 17 can be a continuous plate or it can be composed of a plurality of, for example, partially opened elements. Also in this embodiment not shown, similar to FIG. 6, the hot combustion gas can be guided in an S shape through the combustion chamber if the apparatus is viewed in a longitudinal section.

The apparatus according to the invention which is described in particular with reference to the preceding description and with reference to the preceding embodiments preferably comprises a plurality of heating apparatuses configured as radiant heating apparatuses. The radiation of these heating apparatuses is preferably directed substantially perpendicularly downwards. However, a sloping alignment of the radiation can also correspond to the inventive idea. Preferably the radiant heating apparatuses point downwards so that baking chamber waste cannot drop onto the hot surface. The upper and the lower transport surface of the baking tongs run substantially horizontally.

The hot baking chamber gases are preferably guided substantially horizontally or at least running partially parallel to the transport levels. In this case, the convection flow direction is at least guided in an obliquely running direction so that the average direction of the convection flow from one heating apparatus as far as the vent deviates from the perpendicular direction. As a result of this at least partially horizontal guidance, the heat transfer between the hot combustion chamber gas and the baking tongs is improved.

Optionally in all embodiments the baking chamber 1 can only partially be provided with heating apparatuses. As a result, at least one area of the baking chamber 1 or one section of the transport levels 2a, 2b is substantially unheated or only indirectly heated. The baking chamber 1 in this case comprises one or more heating zones 31 in which the baking tongs 3 are heated directly by radiation of the heating apparatuses in the transport levels 2a, 2b. The baking chamber 1 further comprises one or more radiant-heating-free zone(s) 32 or baking zones in which there is no direct radiant heating of the baking tongs in the transport levels 2a, 2b by the radiant heating apparatuses. In the radiant-heating-free zone(s) 32 the baking tongs 3 are nevertheless at a sufficient temperature for a baking process. Thus, the baking tong 3 or the base body 8 of the baking tong 3 has a certain heat storage capacity. This is sufficient in order to keep the baking tong at a temperature sufficient for baking the baking mixture or the dough even at a distance from the heating apparatuses, in particular in the radiant-heating-free zone 32.

Furthermore, by guiding the hot baking chamber gas along the transport levels 2a, 2b a convective heating of the baking tongs in the entire baking chamber 1 and in particular in the radiant-heating-free zone 32 is achieved. As a result of this sectional direct heating of the baking tongs 3 or the baking tong chain 2, the efficiency is further improved. The heating zones of both transport levels 2a, 2b can, as shown in FIG. 2, be provided in the area of the rear deflection point 18 or shortly before and shortly thereafter. The heating zones of both transport levels 2a, 2b, as shown in FIG. 5 can be provided in the baking chamber, in the area of the partition wall 24. As shown in FIG. 6, two offset heating areas are provided. In the lower baking area 1a the heating area can be provided in the area of the rear deflection point 18 or shortly after the rear deflection point 18. In the upper baking area 1b the heating apparatus can be provided in the baking chamber 1 in the vicinity of the partition wall 24.

Optionally in all embodiments, the following arrangements can be provided: optionally the vent 13 is disposed at a distance from the heating area. Optionally the vent 13 is provided in a radiant-heating-free zone. Optionally the vent 13 is provided in a radiant-heating-free zone of the baking chamber. Optionally the vent 13 is provided on the upper side of the baking chamber so that the hot combustion chamber gas rises due to natural convection in order to leave the baking chamber.

Optionally along the convection flow direction 27 the heating zone 31 is located at a distance from the vent 13. Optionally the heating zone 31 extends over a certain heating length along the course of the baking tong chain 2 and in particular along the transport levels 2a and/or 2b. The heating length can vary according to product and design. For example, this heating length corresponds to approximately a quarter to a half of the length of the baking tong chain section located in the baking chamber and in particular the transport levels 2a, 2b. Optionally the heating length corresponds to approximately a third of the length of the baking tong chain section located in the baking chamber and in particular the transport levels 2a, 2b.

Optionally the radiant-heating-free zone 32 extends over a certain heating-free length along the course of the baking tong chain section located in the baking chamber 1 and in particular along the transport levels 2a, 2b. The heating-free length can vary according to product and design. For example, this length corresponds to approximately two thirds to a half of the length of the baking tong chain section located in the baking chamber and in particular the transport levels 2a, 2b. Optionally the heating length corresponds to approximately two thirds of the length of the baking tong chain section located in the baking chamber and in particular the transport levels 2a, 2b. Optionally the heating length extends over the entire length of the baking chamber 1.

FIG. 7 shows another possible configuration of the baking oven and in particular the baking chamber 1. The elements of the baking oven of FIG. 7 substantially correspond to the preceding elements and in particular the baking oven according to FIG. 2. In addition, however an inlet opening 33 is provided. This is preferably provided at the deflection point 18 or in the region of the rear deflection point 18 of the baking oven. Through this inlet opening 33 for example air or another medium can be introduced into the baking chamber in a controlled manner. This medium or the air is preferably pre-heated in order, for example, to prevent a cooling of the baking chamber. The inlet opening is in particular provided so that the convection by means of which the hot combustion chamber gas escapes through the vent 13 can take place unhindered. In particular, the convection is improved by the provision of the inlet opening 33 and by the supply of the medium through the inlet opening 33.

FIGS. 8a, 8b, 8c and 8d show other schematic possibilities of the arrangement of the heating apparatuses. In particular these can be arranged offset along the baking chamber or in a v shape. At the same time the upper heating apparatuses and the lower heating apparatuses can have the same or different configurations. In the configurations according to FIGS. 8a-8d, the individual heating apparatuses can be configured to be movable to influence the heating power. Also the heating power of individual heating apparatuses or of all the heating apparatuses together can be varied by varying the supplied fuel mass flow.

REFERENCE LIST

1. Baking chamber
1a. Lower baking area
1b. Upper baking area
2. Baking tong chain
2a. Lower transport level
2b. Upper transport level 3. Baking tong
4. Upper plate arrangement
5. Lower plate arrangement
6. Baking mould
7. Back surface
8. Base body
9. Upper heating apparatus
10. Lower heating apparatus
11. Porous body
13. Vent
14. Supply opening
15. Inlet opening for baking tong chain
16. Outlet opening for baking tong chain
17. Convection element
18. Rear deflection point
19. Front oven part
20. Device for opening the baking tongs
21. Dispensing station
22. Loading station
23. Device for closing the baking tongs
24. Partition wall
25. Thermal insulation
26. Underside of the baking chamber
27. Convection flow direction
28. Control unit
29. Sensor
30. Transport direction of the baking tongs
31. Heating zone
32. Radiant-heating-free zone
33. Inlet opening

The invention claimed is:

1. A baking oven for producing baked or edible products, the baking oven comprising:
a baking chamber having a lower baking area and an upper baking area disposed above said lower baking area, said baking chamber delimiting an area;
a baking tong chain moving continuously and circulating along an upper transport level through said upper baking area and along a lower transport level through said lower baking area, said baking tong chain containing baking tongs having open and closed positions;
said baking tongs each including a respective upper plate configuration, a respective lower plate configuration and a respective baking mould for the baked products formed between said upper and lower plate configurations in said closed position;
said upper plate configuration and said lower plate configuration each having a respective side facing away from said baking mould, a back surface disposed at said side and a heat-conducting and storing base body connecting said back surface to said baking mould;
said baking tongs being turned over at a transition from said upper transport level to said lower transport level causing said upper plate configuration disposed above said lower plate configuration at said upper transport level to be disposed below said lower plate configuration at said lower transport level;
at least one upper heating apparatus configured as a radiant heating apparatus and at least one lower heating apparatus configured as a radiant heating apparatus, each of said heating apparatuses burning a respective fuel mixture containing primary air and a fuel;
said upper heating apparatus being disposed in said upper baking area, being disposed above said upper transport level and being directed onto said back surface of said upper plate configuration for heating said baking mould from above;
said lower heating apparatus being disposed in said lower baking area between said upper transport level and said lower transport level and being directed onto said back surface of said lower plate configuration for heating said baking mould from above;
an inlet opening for supplying air or recirculated combustion chamber gas into said baking chamber to improve a convection flow by controlled introduction of air or pre-heated air to prevent any cooling of said baking chamber or recirculated combustion chamber air entering into the baking chamber;
a vent for discharging combustion gases from said baking chamber;
said inlet opening being provided in said baking chamber along a convection flow direction of baking chamber gas remote from said vent, for guiding the hot baking chamber gases substantially horizontally or at least partially parallel to said transport levels; and
said inlet opening delimiting an area occupying less than ten percent of said area delimited by said baking chamber.

2. The baking oven according to claim 1, wherein said heating apparatuses each have an underside, a surface and a porous body on said underside for a combustion of the fuel mixture at least one of in said heating apparatus or on said surface.

3. The baking oven according to claim 2, wherein the combustion is flame-free.

4. The baking oven according to claim 2, wherein said porous body is a metal fabric, a wire fabric or a metal mesh or contains a metal fabric, a wire fabric or a metal mesh.

5. The baking oven according to claim 1, which further comprises:
an upper conveying apparatus and a lower conveying apparatus for supplying the fuel mixture to said heating apparatuses, said upper and lower conveying apparatuses being at least one of controlled or regulated for varying a heating power of said heating apparatuses;
said upper heating apparatus being connected to said upper conveying apparatus and said lower heating apparatus being connected to said lower conveying apparatus, permitting the heating powers of said upper heating apparatus and said lower heating apparatus to be varied or controlled or regulated separately from one another.

6. The baking oven according to claim 5, wherein said conveying apparatuses are blowers.

7. The baking oven according to claim 1, wherein said baking chamber is configured to be substantially closed except for the following openings:
a vent for discharging combustion gases from said baking chamber;
one or more supply openings for a fuel mixture or for primary air and fuel;
an inlet opening for said baking tong chain; and
an outlet opening for said baking tong chain.

8. The baking oven according to claim 7, wherein said baking chamber also has an inlet opening for improving a convection flow by supplying air or recirculated combustion chamber gas into said baking chamber to prevent or limit ambient air or secondary air from entering into said baking chamber.

9. The baking oven according to claim 1, which further comprises a convection conducting element disposed between said lower baking area and said upper baking area for deflecting hot, ascending baking chamber gas of said lower baking area in a horizontal direction and guiding the baking chamber gas in locations through said baking chamber.

10. The baking oven according to claim 9, wherein:
said baking tong chain moves in a running direction through said baking chamber;
said convection conducting element is configured as a plurality of inclined lamellae extended between said lower baking area and said upper baking area transversely to said running direction of said baking tong chain through said baking chamber;
or said convection conducting element is configured as a horizontally running plate body formed with or without openings and being extended through said baking chamber between said lower baking area and said upper baking area.

11. The baking oven according to claim 1, wherein:
said upper heating apparatus is one of a plurality of upper heating apparatuses or said lower heating apparatus is one of a plurality of lower heating apparatuses or both said upper heating apparatus is one of a plurality of upper heating apparatuses and said lower heating apparatus is one of a plurality of lower heating apparatuses and:
said upper heating apparatuses and said lower heating apparatuses have heating powers being varied or controlled or regulated separately,
or two of said upper heating apparatuses have heating powers being varied or controlled or regulated separately,
or two of said lower heating apparatuses have heating powers being varied or controlled or regulated separately.

12. The baking oven according to claim 1, which further comprises a vent disposed along a convection flow direction of baking chamber gas remote from said heating apparatuses for conducting hot ascending baking chamber gas in a horizontal direction through said baking chamber before exiting through said vent.

13. The baking oven according to claim 1, wherein:
said baking tong chain has a rear deflection point;
said upper heating apparatus and said lower heating apparatus are disposed at least one of in a vicinity of said rear deflection point or directly before and after said rear deflection point; and
a vent is disposed along a convection flow direction of baking chamber gas remote from said heating apparatuses.

14. The baking oven according to claim 13, which further comprises a partition wall disposed in said baking chamber, said vent being disposed in a vicinity of said partition wall.

15. The baking oven according to claim 1, which further comprises:
a front oven part in which said baking tongs are guided and deflected from said lower transport level into said upper transport level;
a device for opening said baking tongs, a dispensing station, a loading station and a device for closing said baking tongs being disposed consecutively in a running direction of said baking tongs in said front oven part; and
a partition wall separating said front oven part from said baking chamber, said partition wall having an inlet opening for said baking tong chain and an outlet opening for said baking tong chain disposed therein.

16. The baking oven according to claim 15, wherein said device for opening said baking tongs, said dispensing station, said loading station and said device for closing said baking tongs are disposed along said upper transport level.

17. The baking oven according to claim 1, wherein said baking chamber has walls being completely or partially provided with a thermal insulation (25).

18. The baking oven according to claim 1, wherein said baking chamber has a closed underside and a thermal insulation on said closed underside.

19. The baking oven according to claim 18, wherein said baking chamber has an opening in said underside.

20. The baking oven according to claim 19, wherein said closed underside of said baking chamber has an area, and said opening occupies less than ten percent of said area.

21. The baking oven according to claim 1, wherein said baking chamber has a heating zone in which at least one of said heating apparatuses is disposed for heating said baking tongs by direct action of thermal radiation of said at least one heating apparatus.

22. The baking oven according to claim 21, wherein said baking chamber has a radiant-heating-free zone in which no direct heating of said baking tongs by radiation of said heating apparatuses is provided for heating of said baking tongs by an action of convection heat of hot combustion chamber gas moving in a convention flow direction along at least one of said upper transport level or said lower transport level.

23. The baking oven according to claim 22, which further comprises a vent provided in said radiant-heating-free zone of said baking chamber.

24. The baking oven according to claim 1, which further comprises a sensor for regulating said heating apparatuses.

25. The baking oven according to claim 24, wherein said sensor regulates a heating power of said heating apparatuses.

26. The baking oven according to claim 25, wherein said sensor is a contact-free temperature sensor.

27. The baking oven according to claim 1, wherein said baking tong chain has a rear deflection point, and said inlet opening is provided in a vicinity of said rear deflection point.

* * * * *